United States Patent
Nakai et al.

(10) Patent No.: US 7,926,478 B2
(45) Date of Patent: Apr. 19, 2011

(54) SUPER ABRASIVE GRAIN WIRE SAW WINDING STRUCTURE, SUPER ABRASIVE GRAIN WIRE SAW CUTTING DEVICE, AND SUPER ABRASIVE GRAIN WIRE SAW WINDING METHOD

(75) Inventors: Masanori Nakai, Hyogo (JP); Masaaki Yamanaka, Hyogo (JP); Yoshizumi Ishitobi, Hyogo (JP)

(73) Assignee: A.L.M.T. Corp., Tokyo (JP)

( * ) Notice: Subject to any disclaimer, the term of this patent is extended or adjusted under 35 U.S.C. 154(b) by 539 days.

(21) Appl. No.: 10/571,131

(22) PCT Filed: Jun. 3, 2004

(86) PCT No.: PCT/JP2004/008092
§ 371 (c)(1),
(2), (4) Date: Mar. 9, 2006

(87) PCT Pub. No.: WO2005/063440
PCT Pub. Date: Jul. 14, 2005

(65) Prior Publication Data
US 2007/0023027 A1 Feb. 1, 2007

(30) Foreign Application Priority Data
Dec. 25, 2003 (JP) .................................. 2003-429425

(51) Int. Cl.
*B28D 1/06* (2006.01)
*B28D 1/08* (2006.01)
*B24B 7/00* (2006.01)
*B24B 9/00* (2006.01)
*B26D 5/20* (2006.01)

(52) U.S. Cl. .............. 125/16.02; 125/16.01; 125/21; 451/164; 451/49; 83/651.1

(58) Field of Classification Search ............... 125/16.02, 125/16.01, 21; 451/164, 49, 53, 296; 83/651.1
See application file for complete search history.

(56) References Cited

U.S. PATENT DOCUMENTS
4,015,931 A * 4/1977 Thakur ........................... 125/21
(Continued)

FOREIGN PATENT DOCUMENTS
CN 1216014 5/1999
(Continued)

*Primary Examiner* — Joseph J Hail, III
*Assistant Examiner* — Alvin J Grant
(74) *Attorney, Agent, or Firm* — Birch, Stewart, Kolasch & Birch, LLP (57) ABSTRACT

A superabrasive wire saw-wound structure includes a superabrasive wire saw (10) formed with an average diameter D and a reel (1). The superabrasive wire saw (10) includes a core wire (11), a bonding material (12) surrounding a surface of the core wire (11), and a plurality of superabrasive grains (13) bonded to the surface of the core wire (11) with the bonding material (12). The reel (1) includes a peripheral surface (2) having one end (3) and the other end (4). The superabrasive wire saw (10) which is to be unreeled successively toward a workpiece is wound around the peripheral surface (2) reciprocatingly between the one end (3) and the other end (4) to be multi-layered. A pitch P for winding the superabrasive wire saw (10) around the peripheral surface (2) between the one end (3) and the other end (4) satisfies a relation of $D<P<2D$. According to the present invention, there can be provided a superabrasive wire saw-wound structure, a cutting device with a superabrasive wire saw, and a method of winding a superabrasive wire saw which can reduce damage to a bonding material and falling of a superabrasive grain.

16 Claims, 4 Drawing Sheets

U.S. PATENT DOCUMENTS

| | | | |
|---|---|---|---|
| 4,110,902 A * | 9/1978 | Tamura et al. | 29/603.16 |
| 5,201,305 A * | 4/1993 | Takeuchi | 125/21 |
| 5,564,409 A * | 10/1996 | Bonzo et al. | 125/12 |
| 5,628,301 A * | 5/1997 | Katamachi | 125/21 |
| 5,699,782 A * | 12/1997 | Toyama | 125/21 |
| 5,778,867 A * | 7/1998 | Osanai | 123/698 |
| 5,778,869 A * | 7/1998 | Toyama | 125/16.02 |
| 5,865,162 A * | 2/1999 | Kambe et al. | 125/16.02 |
| 6,070,570 A | 6/2000 | Ueoka et al. | |
| 6,109,253 A * | 8/2000 | Ikehara | 125/12 |
| 6,178,962 B1 * | 1/2001 | Ohashi et al. | 125/16.01 |
| 6,352,071 B1 * | 3/2002 | Kononchuk et al. | 125/16.02 |
| 6,401,333 B1 * | 6/2002 | Suzuki et al. | 29/848 |
| 6,443,143 B1 * | 9/2002 | Ishida et al. | 125/16.02 |
| 6,526,960 B2 * | 3/2003 | Asada et al. | 125/21 |
| 6,742,424 B2 * | 6/2004 | Fukuta et al. | 83/13 |
| 6,945,242 B2 * | 9/2005 | Kondo et al. | 125/21 |
| 7,089,925 B1 * | 8/2006 | Lin et al. | 125/21 |
| 2001/0035173 A1 * | 11/2001 | Asada et al. | 125/16.01 |
| 2001/0042299 A1 * | 11/2001 | Chikuba et al. | 29/557 |
| 2002/0100469 A1 * | 8/2002 | Shimazaki et al. | 125/21 |
| 2002/0115390 A1 * | 8/2002 | Kondo et al. | 451/49 |
| 2004/0255924 A1 | 12/2004 | Kondo et al. | |
| 2005/0155595 A1 * | 7/2005 | Kondo et al. | 125/21 |
| 2006/0258268 A1 * | 11/2006 | Miyata et al. | 451/41 |

FOREIGN PATENT DOCUMENTS

| | | |
|---|---|---|
| CN | 1356194 A | 7/2002 |
| JP | 1-295758 A | 11/1989 |
| JP | 4-351222 A | 12/1992 |
| JP | 5-31865 U | 4/1993 |
| JP | 07-35456 U | 2/1995 |
| JP | 7-35456 U | 7/1995 |
| JP | 8-126953 A | 5/1996 |
| JP | 08-126953 A | 5/1996 |
| JP | 09-155631 A | 6/1997 |
| JP | 9-155631 A | 6/1997 |
| JP | 11-198020 A | 7/1999 |
| JP | 11309661 | 11/1999 |
| JP | 2000-349120 A | 12/2000 |
| JP | 2001-39682 A | 2/2001 |
| JP | 2002-18517 A | 1/2002 |
| JP | 2002-370152 A | 12/2002 |
| JP | 2003-80449 A | 3/2003 |
| RU | 2138372 C1 | 9/1999 |
| SU | 935156 | 6/1982 |
| WO | WO-98/35784 A1 | 8/1998 |
| WO | WO-03/033207 A1 | 4/2003 |

* cited by examiner

SUPER ABRASIVE GRAIN WIRE SAW WINDING STRUCTURE, SUPER ABRASIVE GRAIN WIRE SAW CUTTING DEVICE, AND SUPER ABRASIVE GRAIN WIRE SAW WINDING METHOD

TECHNICAL FIELD

The present invention generally relates to a superabrasive wire saw-wound structure, a cutting device with a superabrasive wire saw, and a method of winding a superabrasive wire saw, and more particularly, to a bonded-abrasive type superabrasive wire saw-wound structure, a cutting device with a superabrasive wire saw, and a method of winding a superabrasive wire saw which are used for slicing a silicon ingot into silicon wafers, and performing a cutting process on various materials such as metal, resin, ore, glass, sapphire, rock crystal, SiC, and compound semiconductor.

BACKGROUND ART

Conventionally, a bonded-abrasive type diamond wire saw, which has diamond abrasive grains bonded to the surface of a core wire, has been proposed as an example of a superabrasive wire saw. With the diamond wire saw, a material such as a metal can be cut extremely cleanly. In addition, there is no need for a slurry having an abrasive fluid and abrasive grains blended; instead, a water-soluble or water-insoluble cutting fluid can be used. Therefore, contamination of a cutting device and its vicinity due to a sludge spattered during cutting can be prevented, and thus working environment can be improved.

In addition, the diamond wire saw can be produced to have a long length such as at least several kilometers. Therefore, a plurality of cutting processes can simultaneously be performed, and accordingly, there can be obtained a cutting rate of at least several times as high as that of a multi-wire saw type using a slurry. Such a bonded-abrasive type superabrasive wire saw is disclosed in Japanese Patent Laying-Open Nos. 8-126953 and 9-155631, International Publication No. WO 98/35784, and others.

In addition, Japanese Patent Laying-Open No. 4-351222 discloses a bonding wire winding which is wound reciprocatingly to be multi-layered such that it is unreeled smoothly during a bonding operation. For the bonding wire winding disclosed in Japanese Patent Laying-Open No. 4-351222, a bonding wire wound around a spool from one end to the other end thereof and the bonding wire further wound around the spool from the other end to the one end thereof are set to cross at an angle of at least 0.03°.

In addition, Japanese Patent Laying-Open No. 2002-18517 discloses a wire-winding device for the purpose of preventing failure in reeling the wire around a bobbin. The wire-winding device disclosed in Japanese Patent Laying-Open No. 2002-18517 is a device for winding an electric wire, a wire, and a cable around a bobbin. The wire-winding device is provided with a bobbin flange detection sensor which is capable of detecting the position of the flange. Every time the sensor detects the flange position, a moving direction of a traverser which serves to guide the wire is reversed.

In addition, Japanese Patent Laying-Open No. 2000-349120 discloses a method of winding a bonding wire for a semiconductor element for the purpose of prolonging the life of a guide, whose damage causes a flaw in the wire. In the winding method disclosed in Japanese Patent Laying-Open No. 2000-349120, a non-rotary type winding guide is used. The winding guide is formed of a hard base material coated with a diamond-like carbon film.

Figure 8:
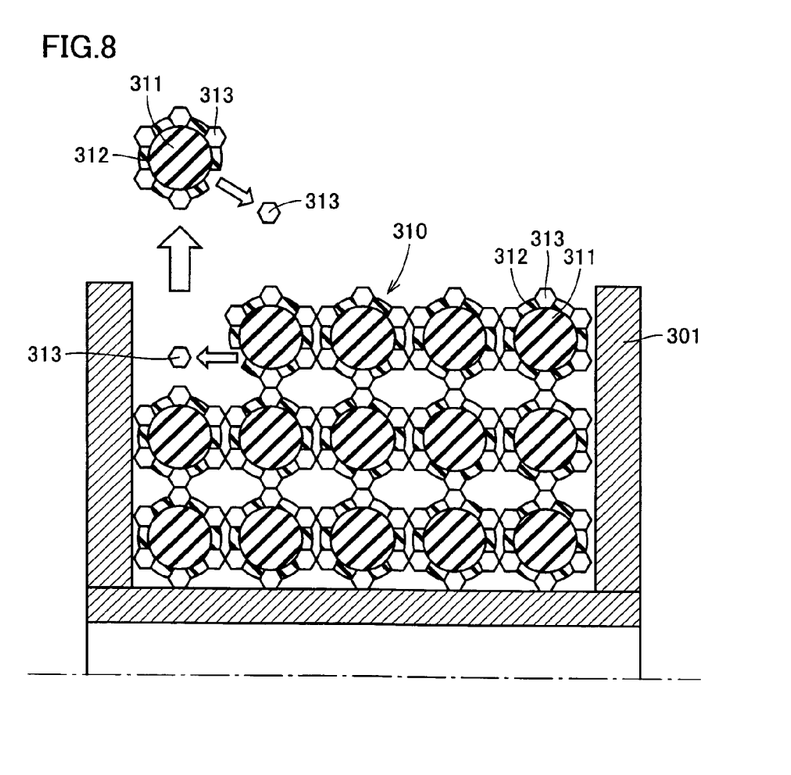
FIG. 8 shows a cross section showing a superabrasive wire saw wound around a reel in a conventional manner.

When a cutting process is performed using the superabrasive wire saw above, the superabrasive wire saw is provided in a reeled-up state, from which the same is unreeled toward or reeled up from a workpiece. Therefore, in order to make the superabrasive wire saw attachable to a cutting device, it is necessary to wind the same around a reel appropriate for the cutting device. FIG. 8 shows a cross section of a superabrasive wire saw wound around a reel in a conventional manner.

Referring to FIG. 8, a superabrasive wire saw 310 includes a core wire 311, and a plurality of superabrasive grains 313 bonded to a surface of core wire 311 with a bonding material 312. Unlike a loose-abrasive type, superabrasive grain 313 is provided to project from a surface of bonding material 312. Superabrasive wire saw 310 is wound around a surface of a reel 301 shaped like a cylinder reciprocatingly between the both ends of the surface to be multi-layered. Superabrasive wire saw 310 is wound with a certain pitch between the both ends of the surface of reel 301, and adjacent superabrasive wire saws 310 are in contact with each other.

When superabrasive wire saw 310 is wound around reel 301 as such, adjacent superabrasive wire saws 310 cause a friction therebetween, with the result that bonding material 312 is damaged by superabrasive grains 313. Furthermore, by an intense collision between superabrasive grains 313, superabrasive grains 313 disadvantageously fall down from the surface of core wire 311. Such problems also occur during a cutting process in which superabrasive wire saw 310 is unreeled toward or reeled up from a workpiece in a state similar to that shown in FIG. 8.

DISCLOSURE OF THE INVENTION

An object of the present invention is to solve the problems above, and provide a superabrasive wire saw-wound structure, a cutting device with a superabrasive wire saw, and a method of winding a superabrasive wire saw which can reduce damage to a bonding material and falling of superabrasive grains.

A superabrasive wire saw-wound structure according to the present invention includes a superabrasive wire saw formed with an average diameter D, and a reel portion. The superabrasive wire saw includes a core wire, a bonding material surrounding a surface of the core wire, and a plurality of superabrasive grains bonded to the surface of the core wire with the bonding material. The reel portion includes a peripheral surface having one end and the other end. The superabrasive wire saw, which is to be unreeled successively toward a workpiece, is wound around the peripheral surface reciprocatingly between the one end and the other end to be multi-layered. A pitch P with which the superabrasive wire saw is wound around the peripheral surface between the one end and the other end satisfies a relation of D<P<2D.

With the superabrasive wire saw-wound structure configured as such, since pitch P with which the superabrasive wire saw is wound is larger than average diameter D of the superabrasive wire saw, when the superabrasive wire saw is wound around the surface of the reel portion, an intense friction between a superabrasive wire saw which is being wound and a superabrasive wire saw which has already been wound in an adjacent position can be prevented. In addition, since pitch P is smaller than 2D, when the superabrasive wire saw is wound around the surface of the reel portion, a superabrasive wire saw which is being wound does not enter a gap between the adjacent superabrasive wire saws which have already been wound in a lower layer. As a result, when the superabrasive wire saw is unreeled again from the reel portion, an intense friction between the superabrasive wire saws can be prevented. For the reasons above, according to the present invention in which pitch P is set within an appropriate range, damage to the bonding material and falling of the superabrasive grains can be reduced.

Preferably, pitch P further satisfies a relation of $1.1D<P<(3^{1/2})D$. With the superabrasive wire saw-wound structure configured as such, the effects described above can more effectively be obtained. In addition, since pitch P is smaller than $(3^{1/2})D$, a superabrasive wire saw which is being wound is not brought into contact with a superabrasive wire saw which has already been wound two layers below. Therefore, damage to the bonding material and falling of the superabrasive grains caused by the contact between the superabrasive wire saws can be reduced.

Preferably, the core wire having an average diameter d1, the superabrasive grain having an average diameter d2, and average diameters d1 and d2 satisfy a relation of $0.02<d2/d1<0.5$. With the superabrasive wire saw-wound structure configured as such, since d2/d1 is smaller than 0.5, the average diameter of the superabrasive grain does not become too large with respect to the average diameter of the core wire. Therefore, the bonding material applied at the surface of the core wire can reliably hold the superabrasive grains. In doing so, falling of the superabrasive grains can further be reduced. In addition, since d2/d1 is larger than 0.02, the superabrasive grains have a certain degree of size. Therefore, there can be prevented falling of the superabrasive grains from the surface of the core wire due to lack of ability to endure a processing stress during cutting. In addition, since the superabrasive grains are not too fine, sharpness of the superabrasive wire saw is not extremely reduced.

Preferably, the bonding material includes at least one selected from the group consisting of a resin bond, an electrodeposition, a metal bond, and a vitrified bond. With the superabrasive wire saw-wound structure configured as such, the superabrasive grains can reliably be held at the surface of the core wire, and falling thereof can be prevented.

The cutting device with a superabrasive wire saw according to the present invention includes a superabrasive wire saw supplier provided by using any of superabrasive wire saw-wound structures described above. With the cutting device with a superabrasive wire saw configured as such, a desired cutting process can be performed by using the superabrasive wire saw with which damage to the bonding material and falling of the superabrasive grains are reduced.

The method of winding a superabrasive wire saw according to the present invention includes the step of preparing a superabrasive wire saw formed with an average diameter D and a reel portion including a peripheral surface having one end and the other end. The superabrasive wire saw includes a core wire, a boding material surrounding a surface of the core wire, and a plurality of superabrasive grains bonded to the surface of the core wire with the bonding material. The method of winding a superabrasive wire saw further includes the step of winding the superabrasive wire saw around the peripheral surface reciprocatingly between the one end and the other end to be multi-layered. The step of winding the superabrasive wire saw includes the step of winding the superabrasive wire saw such that a pitch P for winding the superabrasive wire saw between the one end and the other end satisfies a relation of $D<P<2D$.

According to the method of winding a superabrasive wire saw configured as such, since pitch P with which the superabrasive wire saw is wound is larger than average diameter D of the superabrasive wire saw, when the superabrasive wire saw is wound around the surface of the reel portion, an intense friction between a superabrasive wire saw which is being wound and a superabrasive wire saw which has already been wound in an adjacent position is prevented. In addition, since pitch P is smaller than 2D, when the superabrasive wire saw is wound around the surface of the reel portion, the superabrasive wire saw which is being wound does not enter a gap between the adjacent superabrasive wire saws which have already been wound in a lower layer. In doing so, when the superabrasive wire saw is unreeled again from the reel portion, an intense friction between the superabrasive wire saws can be prevented. For the reasons above, according to the present invention in which pitch P is set within an appropriate range for winding the superabrasive wire saw, damage to the bonding material and falling of the superabrasive grains can be reduced.

Preferably, the step of winding the superabrasive wire saw includes the step of winding the superabrasive wire saw with winding tension corresponding to 5% to 50%, both inclusive, of a breaking strength of the superabrasive wire saw. According to the method of winding a superabrasive wire saw configured as such, since the winding tension is at least 5% of the breaking strength of the superabrasive wire saw, the superabrasive wire saw once wound around the reel portion does not loosen with time. Furthermore, since the winding tension is at most 50% of the breaking strength of the superabrasive wire saw, damage to the bonding material due to engagement of the superabrasive wire saws is prevented.

As described above, according to the present invention, there can be provided a superabrasive wire saw-wound structure, a cutting device with a superabrasive wire saw, and a method of winding a superabrasive wire saw which can reduce damage to a bonding material and falling of superabrasive grains.

BEST MODES FOR CARRYING OUT THE INVENTION

Embodiments in accordance with the present invention will now be described in reference to the drawings.

First Embodiment

Figure 1:
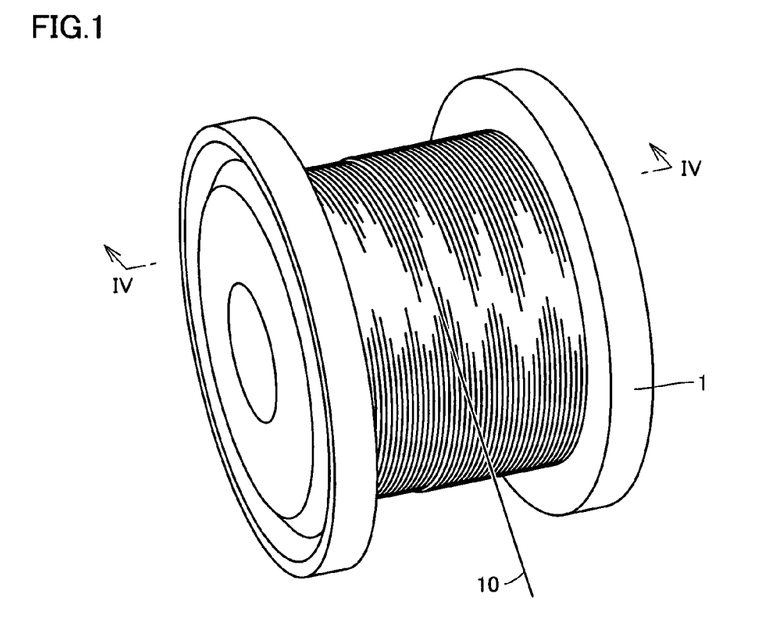
FIG. 1 is a perspective view showing a superabrasive wire saw winding having a superabrasive wire saw-wound structure in accordance with a first embodiment of the present invention.

Referring to FIG. 1, a superabrasive wire saw 10 is wound around a peripheral surface of a reel 1 shaped like a cylinder to be multi-layered. As described in detail below, in the superabrasive wire saw-wound structure in the present embodiment, a pitch P with which superabrasive wire saw 10 is wound around the peripheral surface is set within a predetermined range.

Superabrasive wire saw 10 is used for slicing a silicon ingot into silicon wafers, and performing a cutting process on cemented carbide, cermet, ceramics, germanium, ferrite, Sendust, alnico, samarium cobalt, neodymium magnet, glass, rock crystal, sapphire, stone material, firebrick, tile, resin material, fiber-glass reinforced plastic (FRP), carbon fiber reinforced plastic (CFRP), graphite, grindstone, precious stone, metallic material, and others.

Figure 2:
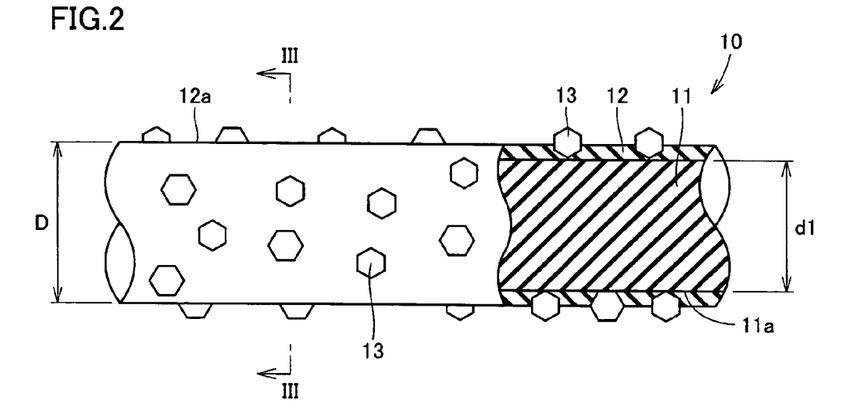
FIG. 2 is a schematic view showing an enlarged superabrasive wire saw shown in FIG. 1.
Figure 3:
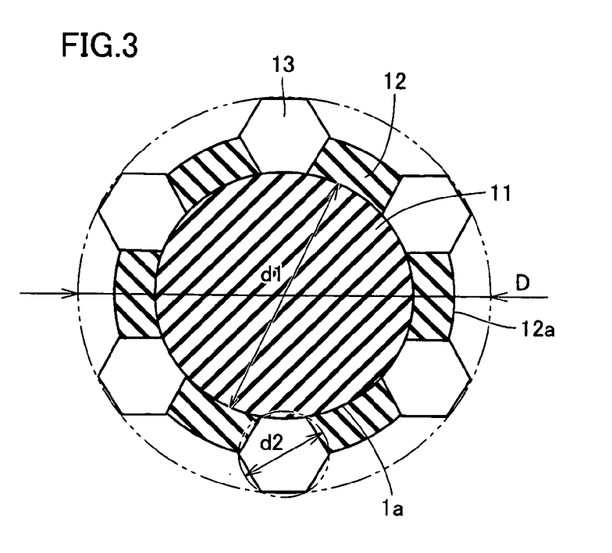
FIG. 3 is a schematic view showing a cross section taken along a line III-III shown in FIG. 2.

A part of FIG. 2 shows a longitudinal cross section of the superabrasive wire saw. Referring to FIGS. 2 and 3, superabrasive wire saw 10 includes a core wire 11 extending linearly, a bonding material 12 covering a surface 11a of core wire 11, and a plurality of superabrasive grains 13 bonded onto surface 11a with bonding material 12. Superabrasive grain 13 is formed of a diamond abrasive grain, for example, and is provided such that a portion thereof protrudes from a surface 12a of bonding material 12.

Superabrasive wire saw 10 has an average diameter D, which is determined as follows: randomly selecting three points of measurement spaced apart in the longitudinal direction of superabrasive wire saw 10; measuring a diameter of superabrasive wire saw 10 in three directions at each of these points to obtain nine measurements in total; and averaging the obtained measurements.

An average diameter d1 of core wire 11 is preferably 0.01 mm to 1 mm both inclusive, and can also be determined by the measuring method described above. For core wire 11, any one of a steel wire, a copper-plated steel wire, and a brass-plated steel wire can be used.

For the steel wire, a piano wire is most preferable because it can easily be formed into an ultrafine wire and has high strength. Although the piano wire can be used as it is, it is preferable to perform thereon a surface treatment such as copper plating or brass plating in order that it is easily preserved and that adhesion of a resin bond thereto is improved to enhance ability to hold the superabrasive grains.

For the core wire made of other materials, it is possible to use a solid wire or stranded wire of any one of carbon fiber, aramid fiber, boron fiber, and glass fiber. Alternatively, it is also possible to use a stranded wire formed by blending at least any two of carbon fiber, aramid fiber, boron fiber, and glass fiber. Furthermore, it is also possible to use as the core wire a stranded wire formed by adding a steel wire to each of these stranded fibers above.

Given that superabrasive grain 13 has an average diameter d2, average diameter d1 of core wire 11 and average diameter d2 of superabrasive grain 13 preferably satisfy a relation of $0.02<d2/d1<0.5$. In this case, it is possible to use core wire 11 having average diameter d1 of 0.11 mm, 0.13 mm, 0.155 mm, 0.16 mm, 0.18 mm, 0.2 mm, or 0.5 mm, for example. At the same time, it is possible to use superabrasive grain 13 having average diameter d2 of 0.010 mm, 0.012 mm, 0.032 mm, 0.042 mm, or 0.055 mm, for example. By using superabrasive grains 13 and core wire 11 satisfying such a relation, superabrasive grains 13, which are reliably held on surface 11a, can contribute to a cutting process. At the same time, clear-cut can be obtained.

For bonding material 12, a resin bond, an electrodeposition, a metal bond, or a vitrified bond can be used. For bonding material 12, it is also possible to use various bonding materials such as a composite bond formed of a resin bond and a metal bond, and a composite bond formed of a resin bond and a vitrified bond. In particular, the effects of the present embodiment can remarkably be exhibited by using a resin bond or a composite bond mainly composed of a resin bond.

From a viewpoint of coefficient of elasticity, softening temperature, formability, and physical properties, preferable examples of resin applicable to the resin bond include alkyd resin, phenol resin, formalin resin, polyurethane resin, polyester resin, polyimide resin, epoxy resin, melamine resin, urea resin, unsaturated polyester resin, acrylic resin, polyesterimide resin, polyamid-imide resin, polyester urethane resin, bismaleimide resin, bismaleimide triazine resin, cyanato ester resin, polyetherimide, polyparabanic acid, aromatic polyamide, and others.

The electrodeposition refers to bonding material 12 electrodeposited on surface 11a of core wire 11. For example, nickel (Ni) plating is applied to surface 11a for serving as bonding material 12. If a metal bond is used as bonding material 12, appropriate metal powder and superabrasive grains 13 are made into mixed powder, which is sintered to surface 11a of core wire 11.

Figure 4:
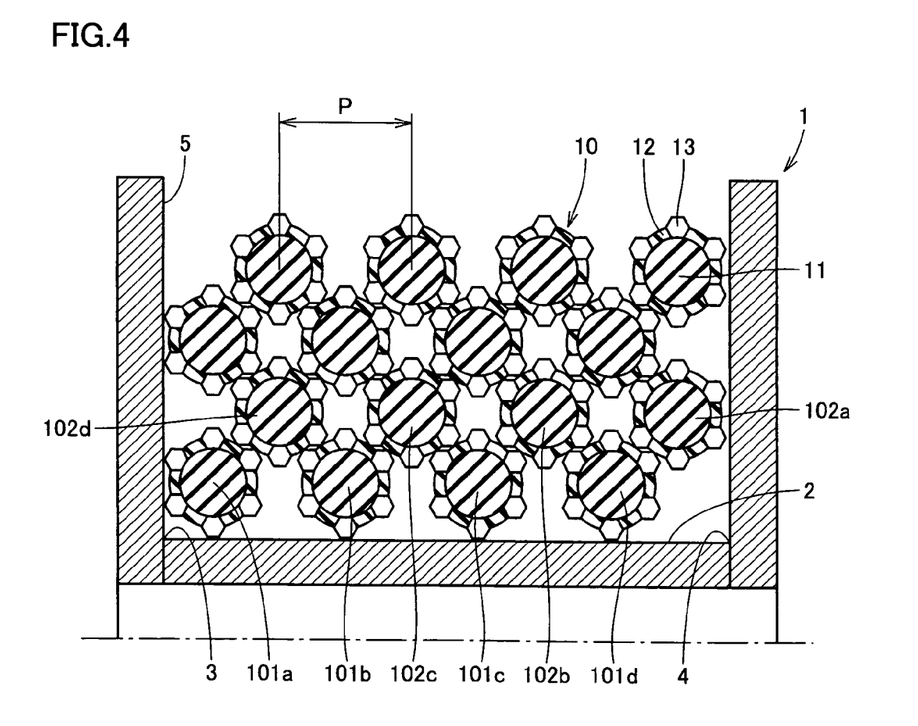
FIG. 4 shows a cross section taken along a line IV-IV shown in FIG. 1.

FIG. 4 schematically shows only a portion of superabrasive wire saw 10 actually wound around reel 1. Referring to FIG. 4, reel 1 has a peripheral surface 2 and an inner wall 5 extending from each end of peripheral surface 2 in the perpendicular direction. At the points where peripheral surface 2 crosses inner walls 5, one end 3 and the other end 4 are defined, respectively.

Superabrasive wire saw 10 is initially wound around peripheral surface 2 from one end 3 to the other end 4 with pitch P (superabrasive wire saws 101a, 101b, 101c and 101d in a first layer). After the superabrasive wire saws for the first layer are wound to the other end 4, superabrasive wire saw 10 is wound from the other end 4 to one end 3 with pitch P over the superabrasive wire saws already wound (superabrasive wire saws 102a, 102b, 102c and 102d in a second layer). Furthermore, superabrasive wire saw 10 is wound from one end 3 to the other end 4 in a third layer, wound from the other end 4 to one end 3 in a fourth layer, and so on, in order to be wound reciprocatingly between one end 3 and the other end 4 with pitch P to be multi-layered.

Pitch P with which superabrasive wire saw 10 is wound around peripheral surface 2 between one end 3 and the other end 4 satisfies a relation of $D<P<2D$. Pitch P preferably satisfies a relation of $1.1D<P<1.9D$.

Figure 5:
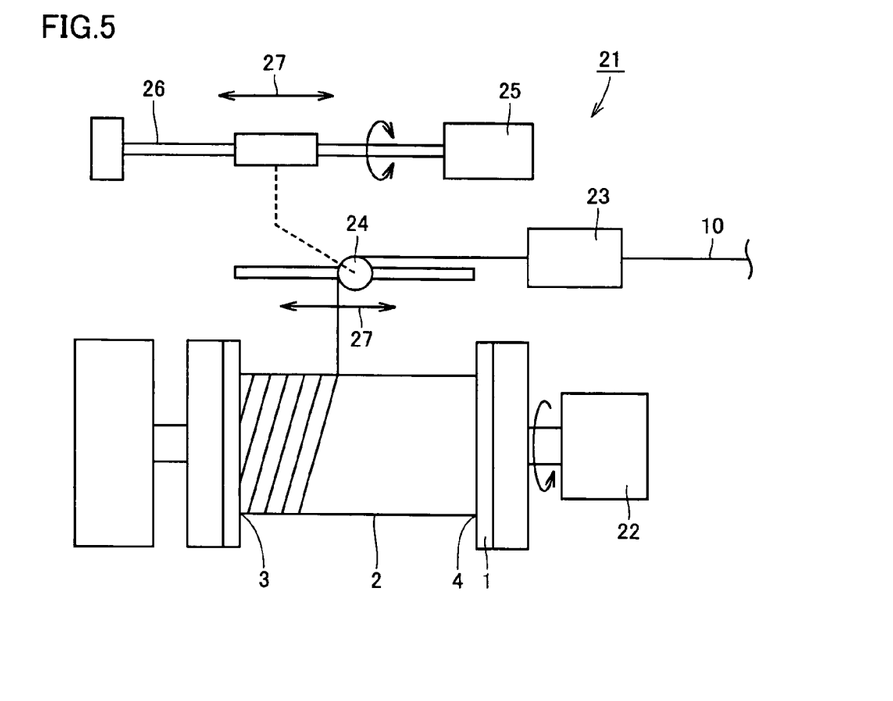
FIG. 5 is a schematic view showing a winding device for producing the superabrasive wire saw winding shown in FIG. 1.

Referring to FIG. 5, a winding device 21 includes a motor 22 as a first driver having a rotating shaft on which reel 1 is mounted for rotating reel 1 at a predetermined rate, a traverser 24 placed in the vicinity of reel 1 for guiding superabrasive wire saw 10 which is to be wound around reel 1, and a motor 25 as a second driver having traverser 24 connected thereto for reciprocating the same.

The rotating shaft of motor 25 is connected to a ball screw 26, and traverser 24 is connected to a nut of ball screw 26. By forward/reverse rotation of motor 25 at a predetermined cycle, traverser 24 can reciprocate in the directions shown in an arrow 27. On a path where superabrasive wire saw 10 is unreeled toward reel 1, a tension meter 23 is provided for measuring winding tension of superabrasive wire saw 10. Winding device 21 is also provided with a controller, which is not shown, for suitably controlling rotating rates of motors 22 and 25, respectively.

A method of winding superabrasive wire saw 10 around reel 1 by using winding device 21 is now described. Initially, reel 1 is mounted on the rotating shaft of motor 22 and a tip of superabrasive wire saw 10 is fixed on one end 3 of peripheral surface 2. Motor 22 is then driven to rotate reel 1 so that superabrasive wire saw 10 guided by traverser 24 is wound around peripheral surface 2. At this stage, based on the rotating rate of motor 22, the controller, which is not shown, indicates to motor 25 an appropriate rotating rate and a timing of reversing the rotating direction to be taken. As a result, traverser 24 reciprocates at a constant rate, and superabrasive wire saw 10 is wound reciprocatingly between one end 3 and the other end 4 to be multi-layered with pitch P satisfying the relation of D<P<2D.

Alternatively, based on winding tension T of superabrasive wire saw 10 measured by tension meter 23, the controller, which is not shown, may indicate to motor 22 an appropriate rotating rate to be taken. In this case, the controller, which is not shown, indicates a rotating rate of motor 22 to be taken such that winding tension T corresponds to 5% to 50%, both inclusive, of the breaking strength of superabrasive wire saw 10. In doing so, superabrasive wire saw 10 once wound can be prevented from loosening. At the same time, damage to bonding material 12 due to engagement of wound superabrasive wire saws 10 can be prevented.

More preferably, the rotating rate of motor 22 is controlled such that winding tension T corresponds to 5% to 30%, both inclusive, of the breaking strength of superabrasive wire saw 10. Still more preferably, the rotating rate of motor 22 is controlled such that winding tension T corresponds to 10% to 20%, both inclusive, of the breaking strength of superabrasive wire saw 10.

With the superabrasive wire saw-wound structure and the method of winding a superabrasive wire saw configured as such, superabrasive wire saw 10 is wound with pitch P satisfying the relation of D<P. Therefore, when superabrasive wire saw 10 is wound around reel 1, adjacent superabrasive wire saws 10 (for example, superabrasive wire saws 102b and 102c in FIG. 4) do not cause a friction therebetween. Since superabrasive wire saw 10 is wound with pitch P satisfying the relation of P<2D, superabrasive wire saw 10 which is being wound does not enter a gap between superabrasive wire saws 10 adjacent with each other in the lower layer (for example, superabrasive wire saw 102b does not enter a gap between superabrasive wire saw 101c and superabrasive wire saw 101d in FIG. 4). In doing so, damage to bonding material 12 of superabrasive wire saw 10 and falling of superabrasive grains 13 can be prevented.

As a winding device for producing a superabrasive wire saw winding, the present embodiment uses horizontal-type winding device 21 with which superabrasive wire saw 10 is wound around reel 1 reciprocatingly in a horizontal direction. However, there may be used any winding device with which superabrasive wire saw 10 is wound in any other direction such as a vertical-type winding device with which superabrasive wire saw 10 is wound in a vertical direction. Note that since the use of horizontal-type winding device 21 is not affected by gravity, superabrasive wire saw 10 does not slide over peripheral surface 2 of reel 1, which results in easy winding thereof with predetermined pitch P.

Second Embodiment

A superabrasive wire saw-wound structure according to the second embodiment of the present invention basically has a structure similar to that of the first embodiment. The description of the overlapping structure thereof will not be repeated herein.

According to the present embodiment, superabrasive wire saw 10 is wound around peripheral surface 2 of reel 1 with pitch P further satisfying a relation of $1.1D<P<(3^{1/2})D$. More preferably, pitch P satisfies a relation of $1.2D<p<(3^{1/2})D$.

With the superabrasive wire saw-wound structure configured as such, the effects which will be described below can be obtained in addition to the effects of the first embodiment.

Figure 6:
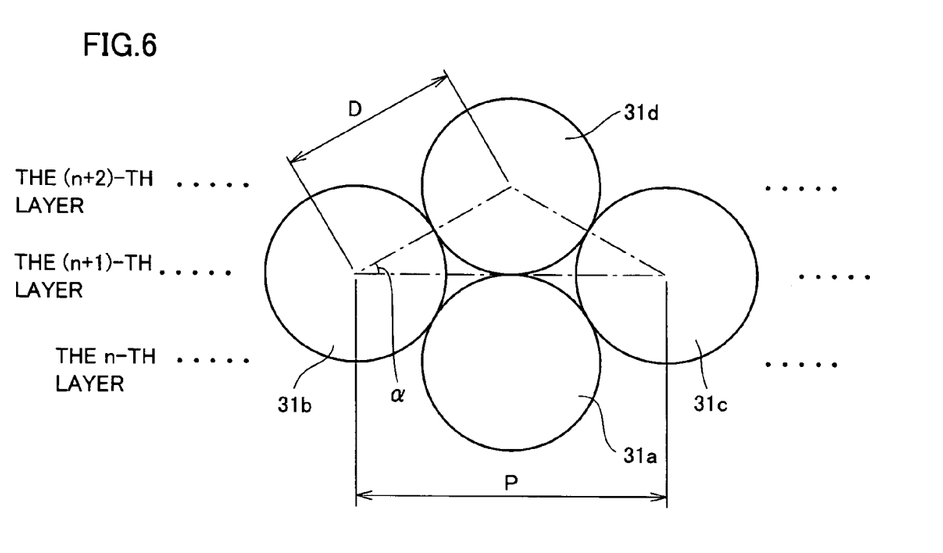
FIG. 6 is a schematic view showing a contour of the superabrasive wire saw wound around a reel.

Referring to FIG. 6, over a superabrasive wire saw 31a wound in an n-th layer, a superabrasive wire saws 31b and 31c are wound in an (n+1)-th layer and a superabrasive wire saw 31d is wound in an (n+2)-th layer. These superabrasive wire saws are wound with pitch P satisfying a relation of $P=(3^{1/2})$ D.

In this case, the angle α shown in FIG. 6 is 30°, and superabrasive wire saw 31d wound in the (n+2)-th layer is in contact with superabrasive wire saws 31b and 31c wound in the (n+1)-th layer, and superabrasive wire saw 31a wound in the n-th layer as well. Such contacts increase the risk of damage to bonding material 12 of superabrasive wire saw 31a. If the superabrasive wire saw is wound with pitch P satisfying a relation of $P>(3^{1/2})$ D, superabrasive wire saw 31d is in contact with superabrasive wire saw 31a only. In this case, the superabrasive wire saw becomes unstable in its wound state, which results in the risk of fluctuations in winding pitch.

Therefore, with the superabrasive wire saw-wound structure in the present embodiment, damage to bonding material 12 and falling of superabrasive grains 13 can further be reduced, and superabrasive wire saw 10 can be wound around reel 1 without any fluctuations in winding pitch.

Third Embodiment

Figure 7:
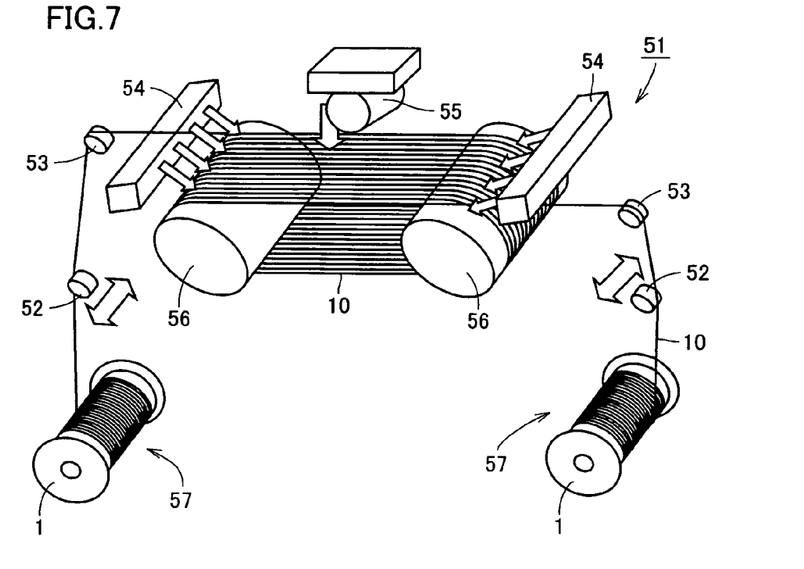
FIG. 7 is a perspective view showing a cutting device with a superabrasive wire saw in accordance with a third embodiment of the present invention.

Referring to FIG. 7, a cutting device with a superabrasive wire saw 51 (hereinafter referred to "cutting device 51") includes a superabrasive wire saw supplier 57 reeling and unreeling superabrasive wire saw 10 to and from a workpiece 55. Superabrasive wire saw supplier 57 is provided with reel 1 having superabrasive wire saw 10 wound by using the superabrasive wire saw-wound structure according to the first or second embodiment. Two reels 1 are placed on respective lateral sides with respect to workpiece 55 and mounted on the rotating shafts of the motors, respectively.

Cutting device 51 further includes a plurality of guide rollers 52 and 53 guiding superabrasive wire saw 10, two main rollers 56 placed under workpiece 55 at a predetermined spacing, and two cutting fluid nozzles 54 provided in the vicinity of main rollers 56, respectively. Grooves are provided on a peripheral surface of main roller 56 according to a cutting size of workpiece 55. Superabrasive wire saw 10, with both ends thereof wound around two reels 1, respectively, is guided by the groove to be stretched taut between two main rollers 56. Guide roller 52 is provided such that it can reciprocate in a predetermined direction.

When workpiece 55 is cut with cutting device 51, the motor to which reel 1 is connected is rotated in forward/reverse direction, which causes superabrasive wire saw 10 to reciprocate between two reels 1. At this stage, guide roller 52 may be reciprocated in a manner similar to that of traverser 24 shown in FIG. 5. In doing so, even in a cutting process using cutting device 51, superabrasive wire saw 10 is wound around reel 1 with predetermined pitch P, with the result that the effects similar to those of the first or second embodiment can be obtained.

Thereafter, workpiece 55 is pressed against a plurality of superabrasive wire saws 10 moving between two main rollers 56. In doing so, workpiece 55 can be cutting-processed into a plurality of pieces. In the process, a cutting fluid is supplied through cutting fluid nozzles 54 to workpiece 55 and the grooves formed on the peripheral surface of main roller 56. The cutting fluid serves to reduce a friction in a cutting process and promote cooling. When guide roller 52 is reciprocated such that superabrasive wire saw 10 is wound with predetermined pitch P, a cutting fluid supplied in the cutting process exists in a gap between superabrasive wire saws 10 wound around reel 1. Therefore, it is believed that the above-described effects by the cutting fluid can be obtained much more effectively.

With the cutting device with a superabrasive wire saw configured as such, since superabrasive wire saw 10 wound with predetermined pitch P is used, damage to bonding material 12 and falling of superabrasive grains 13 are prevented even when superabrasive wire saw 10 is unreeled again from reel 1. Therefore, workpiece 55 can be cut extremely cleanly, and the life of superabrasive wire saw 10 can be prolonged. If guide roller 52 is reciprocated such that superabrasive wire saw 10 is wound with predetermined pitch P, damage to bonding material 12 and falling of superabrasive grains 13 can be reduced even when a cutting process continues.

In order to evaluate the superabrasive wire saw-wound structure and the method of winding a superabrasive wire saw according to the present invention, examples and comparative examples are provided, which will be described below.

EXAMPLE 1

By using cutting device 51 in FIG. 7, a test was conducted to examine influences of winding pitch P of superabrasive wire saw 10 on damage to bonding material 12 and falling of superabrasive grains 13. A piano wire having average diameter d1 of 0.18 mm was used as core wire 11 of superabrasive wire saw 10. Diamond superabrasive grains having average diameter d2 of 42 μm were used as superabrasive grains 13. A phenol resin was used as bonding material 12. Average diameter D of superabrasive wire saw 10 was 0.25 mm.

Under the test conditions below, there was conducted an unreeling test in which superabrasive wire saw 10 was repeatedly reciprocated between two reels 1.

Test Conditions:
Rate of superabrasive wire saw; 800 m/min
Winding tension T; 9.8N
Winding pitch P; 0.4 mm (D<P<2D)
Cutting fluid; water-soluble cutting fluid
Unreeling cycle (one reciprocation is defined as one cycle); 212 cycles After the test, superabrasive wire saw 10 having a length of approximately 82 m and stretched taut between two main rollers 56 was observed under a microscope to determine a cumulative peel length of bonding material 12 and check for falling of superabrasive grains 13. The result showed that a cumulative peel length of bonding material 12 was 50 mm and that almost no falling of superabrasive grains 13 was observed.

Comparative Example 1

By using superabrasive wire saw 10 specified similarly to that of example 1, an unreeling test was conducted according to the test conditions of example 1 with the exception that only winding pitch P thereamong was set to 0.2 mm (P<D). After the test, the observation of superabrasive wire saw 10 as in example 1 showed that a cumulative peel length of bonding material 12 was 250 mm and that falling of superabrasive grains 13 was observed.

Comparative Example 2

By using superabrasive wire saw 10 specified similarly to that of example 1, an unreeling test was conducted according to the test conditions of example 1 with the exception that only winding pitch P thereamong was set to 0.6 mm (P>2D). After the test, the observation of superabrasive wire saw 10 as in example 1 showed that a cumulative peel length of bonding material 12 was 280 mm and that falling of superabrasive grains 13 was observed.

EXAMPLE 2

Next, by using superabrasive wire saw 10 specified similarly to that of example 1, an unreeling test was conducted under the test conditions below to examine the effects of the change in winding tension T of superabrasive wire saw 10. Note that a tensile test was performed on superabrasive wire saw 10 in advance, showing that the breaking strength thereof was 78N.

Test Conditions:
Rate of superabrasive wire saw; 800 m/min
Winding tension T; 9.8N (corresponding to 12.6% of the breaking strength of superabrasive wire saw 10)
Winding pitch P; 0.4 mm (D<P<2D)
Cutting fluid; water-soluble cutting fluid
Unreeling cycle; 424 cycles After the test, the observation of superabrasive wire saw 10 as in example 1 showed that a cumulative peel length of bonding material 12 was 350 mm.

EXAMPLE 3

By using superabrasive wire saw 10 specified similarly to that of example 1, an unreeling test was conducted according to the test conditions of example 2 with the exception that only winding tension T thereamong was set to 25.7N (corresponding to 33% of the breaking strength of superabrasive wire saw 10). After the test, the observation of superabrasive wire saw 10 as in example 1 showed that a cumulative peel length of bonding material 12 was 2300 mm.

EXAMPLE 4

By using superabrasive wire saw 10 specified similarly to that of example 1, an unreeling test was conducted according to the test conditions of example 2 with the exception that only winding tension T thereamong was set to 29.4N (corresponding to 37.7% of the breaking strength of superabrasive wire saw 10). After the test, the observation of superabrasive wire saw 10 as in example 1 showed that a cumulative peel length of bonding material 12 was 4120 mm.

Comparative Example 3

By using superabrasive wire saw 10 specified similarly to that of example 1, an unreeling test was conducted according to the test conditions of example 2 with the exception that only winding tension T thereamong was set to 39.2N (corresponding to 52% of the breaking strength of superabrasive wire saw 10). After the test, the observation of superabrasive wire saw 10 as in example 1 showed that a cumulative peel length of bonding material 12 was 6530 mm.

Comparative Example 4

By using superabrasive wire saw 10 specified similarly to that of example 1, an unreeling test was attempted according to the test conditions of example 2 with the exception that winding tension T thereamong was set to 3N (corresponding to 3.8% of the breaking strength of superabrasive wire saw 10). In this case, however, superabrasive wire 10 loosened while it was being wound around reel 1, which resulted in a cancellation of the test.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The present invention is employed for a bonded-abrasive type superabrasive wire saw used for slicing a silicon ingot into silicon wafers, and performing a cutting process on various materials such as metal, resin, ore, glass, sapphire, rock crystal, SiC, and compound semiconductor.

The invention claimed is:

1. A superabrasive wire saw-wound structure comprising:
a superabrasive wire saw formed with an average diameter D and including a core wire, a bonding material surrounding a surface of said core wire, and a plurality of superabrasive grains bonded to the surface of said core wire with said bonding material; and
a reel portion including a peripheral surface having one end and the other end, said superabrasive wire saw to be unreeled successively toward a workpiece being wound around said peripheral surface reciprocatingly between said one end and said other end to be multi-layered, wherein
a pitch P for winding said superabrasive wire saw around said peripheral surface between said one end and said other end satisfies a relation of $1.1D < P < (3^{1/2}) D$.

2. The superabrasive wire saw-wound structure according to claim 1, wherein each of said superabrasive grains is provided to partly project from a surface of said bonding material.

3. The superabrasive wire saw-wound structure according to claim 1, wherein said pitch P further satisfies a relation of $1.2D < P < (3^{1/2}) D$.

4. The superabrasive wire saw-wound structure according to claim 1, wherein said core wire having an average diameter $d_1$, each of said superabrasive grains having an average diameter $d_2$, and the average diameters $d_1$ and $d_2$ satisfy a relation of $0.02 < d_2/d_1 < 0.5$.

5. The superabrasive wire saw-wound structure according to claim claim 1, wherein said bonding material includes at least one selected from the group consisting of a resin bond, an electrodeposition, a metal bond, and a vitrified bond.

6. The superabrasive wire saw-wound structure according to claim claim 1, wherein said bonding material is a resin bond.

7. The superabrasive wire saw-wound structure according to claim 1, wherein said bonding material includes at least one selected from the group consisting of alkyd resin, phenol resin, formalin resin, polyurethane resin, polyester resin, polyimide resin, epoxy resin, melamine resin, urea resin, unsaturated polyester resin, acrylic resin, polyesterimide resin, polyamid-imide resin, polyester urethane resin, bismaleimide resin, bismaleimide triazine resin, cyanato ester resin, polyetherimide, polyparabanic acid, and aromatic polyamide.

8. A cutting device with a superabrasive wire saw comprising a superabrasive wire saw supplier provided by using the superabrasive wire saw-wound structure recited in claim 1.

9. A method of winding a superabrasive wire saw comprising the steps of:
preparing a superabrasive wire saw formed with an average diameter D and including a core wire, a bonding material surrounding a surface of said core wire, and a plurality of superabrasive grains bonded to the surface of said core wire with said bonding material, and a reel portion including a peripheral surface having one end and the other end; and
winding said superabrasive wire saw around said peripheral surface reciprocatingly between said one end and said other end to be multi-layered, wherein
said step of winding said superabrasive wire saw includes the step of winding said superabrasive wire saw such that a pitch P for winding said superabrasive wire saw between said one end and said other end satisfies a relation of $1.1D < P < (3^{1/2})D$.

10. The method of winding a superabrasive wire saw according to claim 9, wherein each of said superabrasive grains is provided to partly project from a surface of said bonding material.

11. The method of winding a superabrasive wire saw according to claim 9, wherein said step of winding said superabrasive wire saw includes the step of winding said superabrasive wire saw such that said pitch P satisfies a relation of $1.2D < P < (3^{1/2}) D$.

12. The method of winding a superabrasive wire saw according to claim 9, wherein said core wire having an average diameter $d_1$, each of said superabrasive grains having an average diameter $d_2$, and the average diameters $d_1$ and $d_2$ satisfy a relation of $0.02 < d_2/d_1 < 0.5$.

13. The method of winding a superabrasive wire saw according to claim 9, wherein said step of winding said superabrasive wire saw includes the step of winding said superabrasive wire saw with winding tension corresponding to 5% to 50%, both inclusive, of a breaking strength of said superabrasive wire saw.

14. The method of winding a superabrasive wire saw according to claim 13, wherein said step of winding said superabrasive wire saw includes the step of winding said superabrasive wire saw with winding tension corresponding to 10% to 20%, both inclusive, of a breaking strength of said superabrasive wire saw.

15. The method of winding a superabrasive wire saw according to claim 9, wherein said bonding material is a resin bond.

16. The method of winding a superabrasive wire saw according to claim 9, wherein said bonding material includes at least one selected from the group consisting of alkyd resin, phenol resin, formalin resin, polyurethane resin, polyester resin, polyimide resin, epoxy resin, melamine resin, urea resin, unsaturated polyester resin, acrylic resin, polyesterimide resin, polyamid-imide resin, polyester urethane resin, bismaleimide resin, bismaleimide triazine resin, cyanato ester resin, polyetherimide, polyparabanic acid, and aromatic polyamide.

* * * * *